(12) United States Patent
Reis et al.

(10) Patent No.: US 7,014,805 B1
(45) Date of Patent: Mar. 21, 2006

(54) PROCESS FOR MAKING A CURVED PI SHAPED PREFORM MADE FROM WOVEN COMPOSITE MATERIALS

(75) Inventors: Carl Andrew Reis, Torrnace, CA (US); Douglas Dean Decker, Redondo Beach, CA (US); Christopher H. Husmann, Gardena, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 68 days.

(21) Appl. No.: 10/779,901

(22) Filed: Feb. 17, 2004

(51) Int. Cl.
  *B29C 70/46* (2006.01)
  *B29C 43/14* (2006.01)

(52) U.S. Cl. .................... 264/138; 264/257; 264/258; 264/291; 264/324

(58) Field of Classification Search ............... 264/138, 264/255–258, 313–314, 317, 324, 266, 282, 264/284, 285, 291
See application file for complete search history.

(56) References Cited

U.S. PATENT DOCUMENTS

| 6,007,319 | A | 12/1999 | Jacobson | 425/140 |
| 6,446,675 | B1 | 9/2002 | Goering | 139/11 |
| 6,520,706 | B1 * | 2/2003 | McKague, Jr. et al. | 403/265 |
| 6,553,734 | B1 * | 4/2003 | McKague, Jr. et al. | 52/309.1 |

FOREIGN PATENT DOCUMENTS

WO   WO 01/64387 A1   7/2001

* cited by examiner

*Primary Examiner*—Stefan Staicovici
(74) *Attorney, Agent, or Firm*—Stetina, Brunda, Garred & Brucker (57) ABSTRACT

The invention is a process for forming a 3D woven PI shaped cross-section preform having a first and second bottom foot portions and first and second upstanding leg portions for use in a structure having at least one curved portion of a specific length. In detail, the process includes the steps of: 1) cutting the treads parallel to the direction of curvature into over a length equal to the length, such that the cuts in each thread are spaced from the cuts in the adjacent treads; 2) stretching the portions of the preform requiring curvature; and 3) forming the curvature in the preform.

13 Claims, 7 Drawing Sheets

PROCESS FOR MAKING A CURVED PI SHAPED PREFORM MADE FROM WOVEN COMPOSITE MATERIALS

BACKGROUND OF THE INVENTION

1. Field of the Invention

The invention relates to the field of composite structure fabrication techniques and, in particular, to a process for forming curves in woven composite preforms.

2. Description of Related Art

Typically T shaped composite structures are fabricated by joining the vertical member to the horizontal member by bonding a multi-number of reinforcing sheets across the joint (extending from the horizontal member up along the side of the vertical member). Such a joint is disclosed in WIPO Publication WO 01/64387 A1 Production, Forming, Bonding Joining And Repair Systems For Composite And Metal Components by N. Graham. Two honeycomb sheets are joined by layers of composite cloth to the horizontal member on each side of the vertical member that extend up each side of the vertical member. The disadvantage is that the joint's strength is dependent on the layers of composite cloth.

Recently, three-dimensional weaving has allowed very complex shapes to be woven. For example, U.S. Pat. No. 6,007,319 Continuous Forming Of Complex Molded Shapes by T. L. Jacobson, et al. discloses a method of weaving complex preform shapes. More recently a process for making woven 3D PI cross-section shapes in U.S. Pat. No. 6,446,675 Minimum Distortion 3D Woven Preforms by J. Goering. Such preforms can be impregnated with a resin and partially cured (called B stage) and stored for relatively long periods at low temperature until use is required. However, attempts to use such a preform in a curved structure has resulted in severe distortion.

Thus, it is a primary object of the invention to provide a process for making curved 3D woven PI preforms structures.

It is a further object of the invention to provide a process for making such 3D woven PI preforms in curved structures that does not significantly reduce the strength of the preform.

SUMMARY OF THE INVENTION

The invention is a process for forming a 3D woven PI shaped cross-section preform having a first and second upstanding leg portions and first and second foot portions for use in a structure having at least one curved portion of a specific length. The process includes the steps of:

1. Cutting the threads parallel to the direction of curvature over a length equal to the length of the curve, such that the cuts in each thread are spaced from the cuts in the adjacent treads. Preferably, the first and second upstanding leg portions are folded over the first and second bottom foot portions, prior to the step of cutting.
2. Stretching the portions of the preform requiring curvature. If the preform must be curved in the plane of the bottom foot portions with the first bottom portion requires greater stretching than the second bottom foot portion, both upstanding legs are bent over on to one of the bottom foot portions in a "cactus" configuration. The preform is then placed between matched tapered sign-wave dies, with a small amplitude end and a large amplitude end, with the first portion positioned in the small amplitude end and the second end in the large amplitude end. Stretching is accomplished by closing the die halves. If the completed preform requires concave curvature of the bottom foot portions, the bottom foot and upstanding leg portions of the preform are bent toward each other in an "H" configuration, but only the upstanding legs are placed in a small to large amplitude tapered sign wave die for stretching while the foot portion is stretched at a constant amount in the large amplitude section of the die. If on the other hand the bottom foot portions require a convex shape, the bottom foot and upstanding leg portions are again folded together in an "H" configuration. However the die shape is tapered over the length of the upstanding legs from small to large amplitude and the foot bottom portions are outside of the stretching sinewave die.
3. Forming the curvature in the preform. After the step of stretching, the preform is expanded about a die surface having the final desired shape of the preform.

The preform can thereafter be used in the making of curved composite structures, primarily as a transition member between sheet type structural members. Note that the preform can be pre-impregnated with a resin prior to any forming steps.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
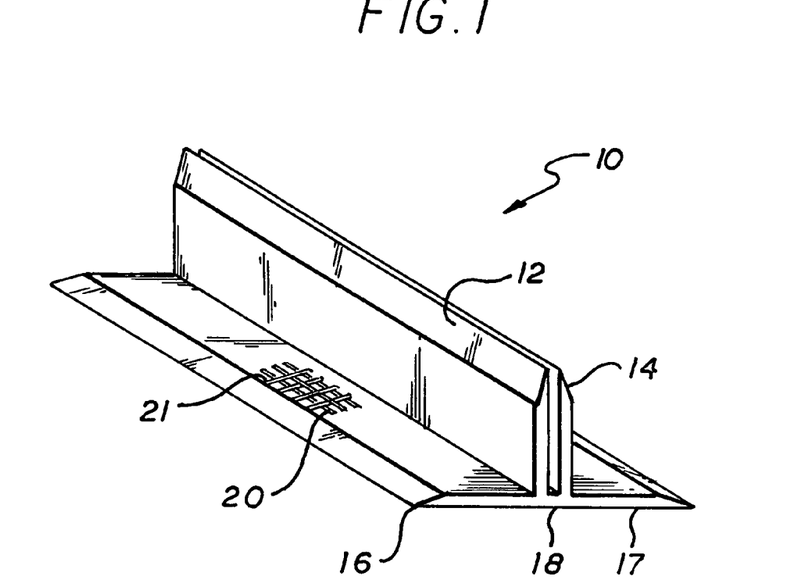
FIG. 1 is a perspective view of the PI shaped preform made of woven filamentary material.
Figure 2:
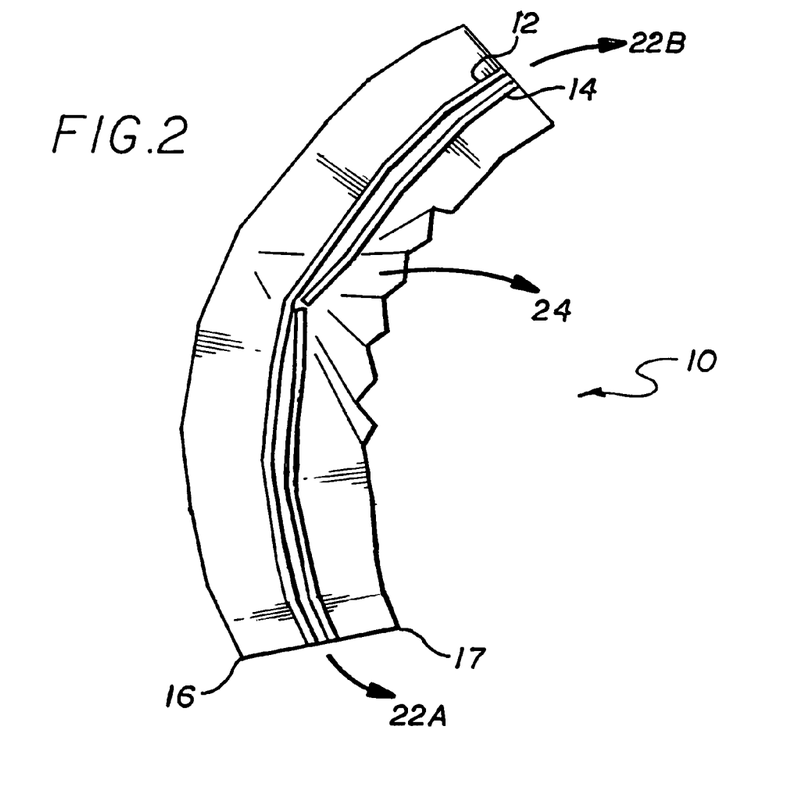
FIG. 2 is a top view of the PI shaped preform shown in FIG. 1 illustrating the effect of attempting to curve the preform in the "as is" condition.

The typical PI woven preform is illustrated in FIGS. 1 and 2, indicated by numeral 10. The preform 10 includes upstanding legs 12 and 14 and bottom foot portions 16 and 17, with center or root 18. The warp fibers 20 run parallel to the legs 12 and 14, while the fibers 21 run perpendicular to the upstanding legs. If one tries to form a curve, indicated by arrows 22A and 22B, the legs 12 and 14 tend to bend over indicated by arrow 24. Attempts to "bend" the preform 10 into other shapes also cause one or more portions to warp. The subject process will eliminate this problem.

Figure 3:
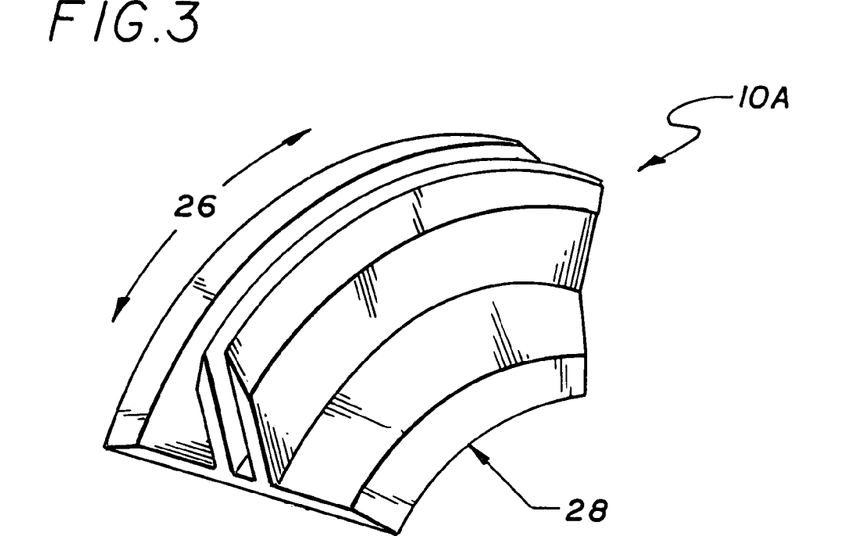
FIG. 3 is a perspective view of the desired curved shape for the preform shown in FIG. 1.
Figure 4:
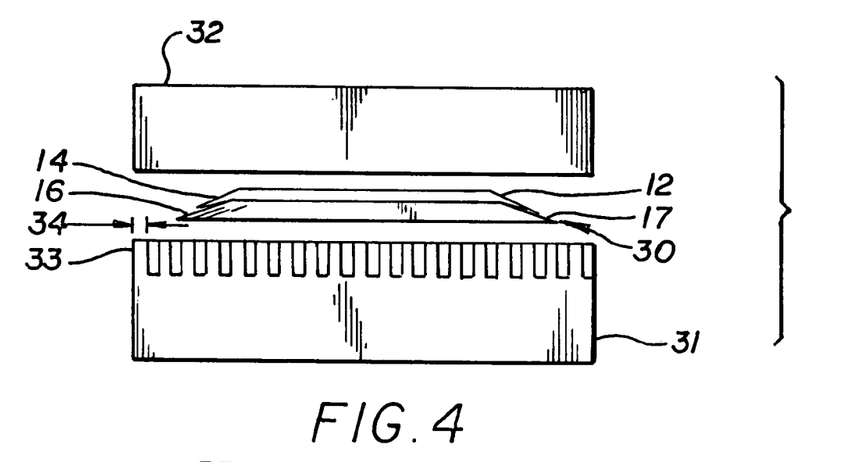
FIG. 4 is an end view of the preform with the legs folded over on the bottom portions installed in a darting die assembly.
Figure 5:
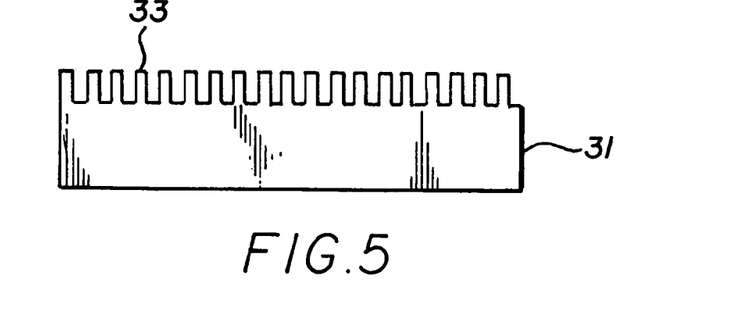
FIG. 5 is a side view of the bottom portion of the die illustrating the placement of the cutters used for darting the preform.
Figure 6:
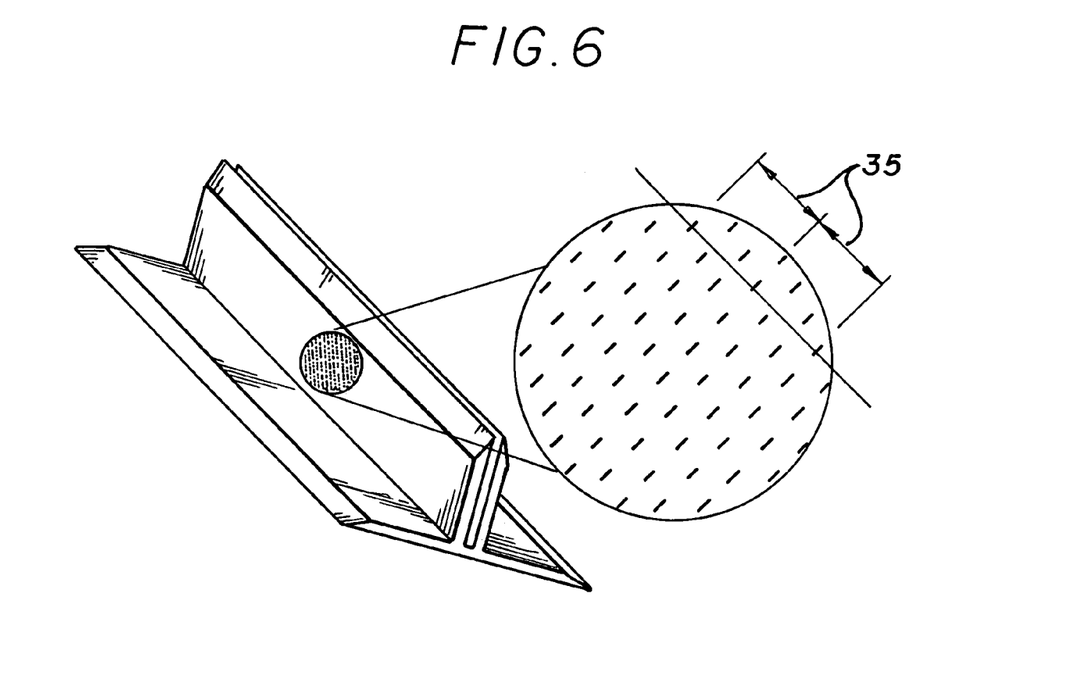
FIG. 6 is an enlarged view of a portion of the preform, after darting illustrating the darting pattern.
Figure 7:
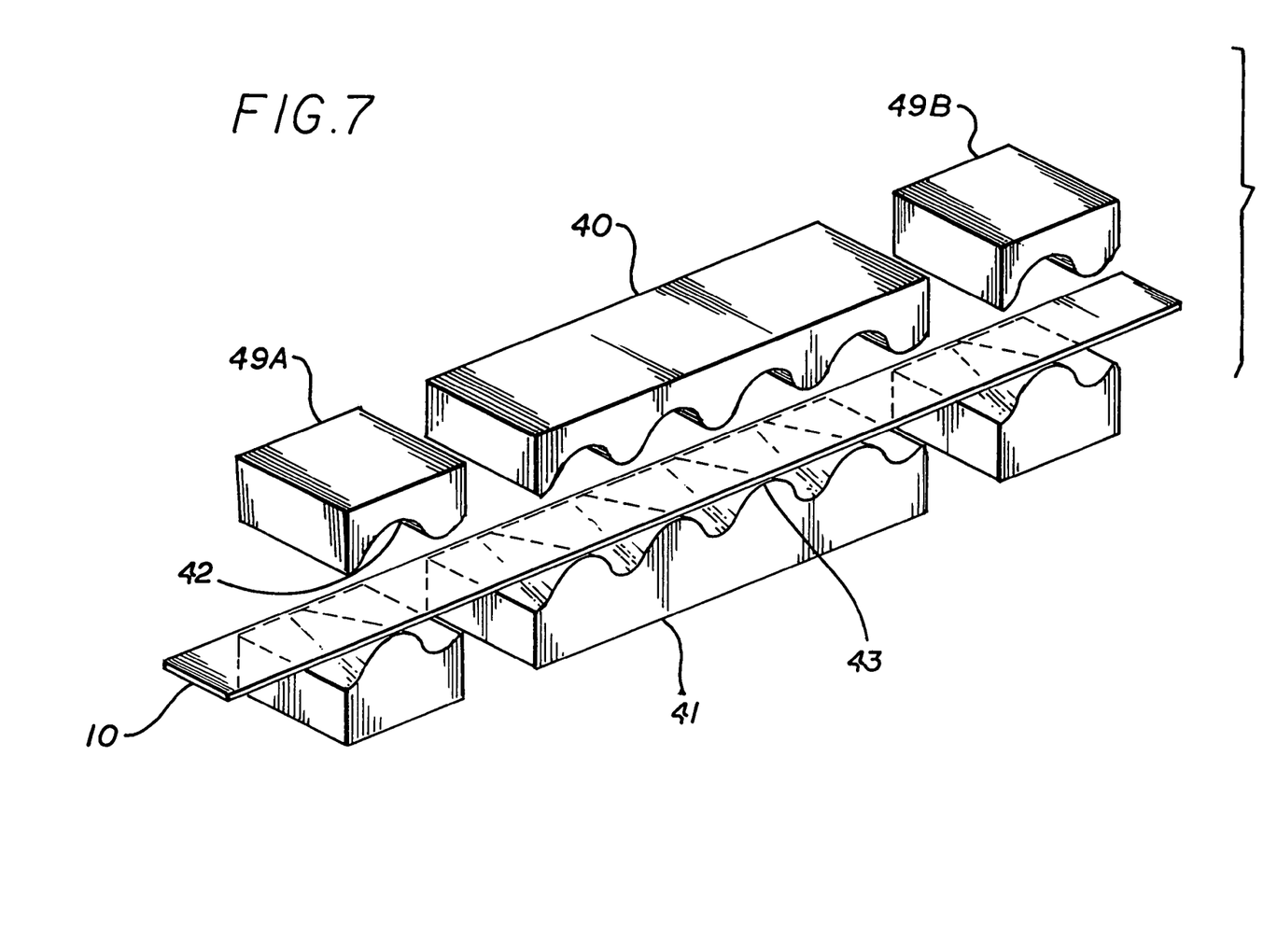
FIG. 7 is a perspective view of a sine wave forming die assembly used for selectively stretching the preform.
Figure 14:
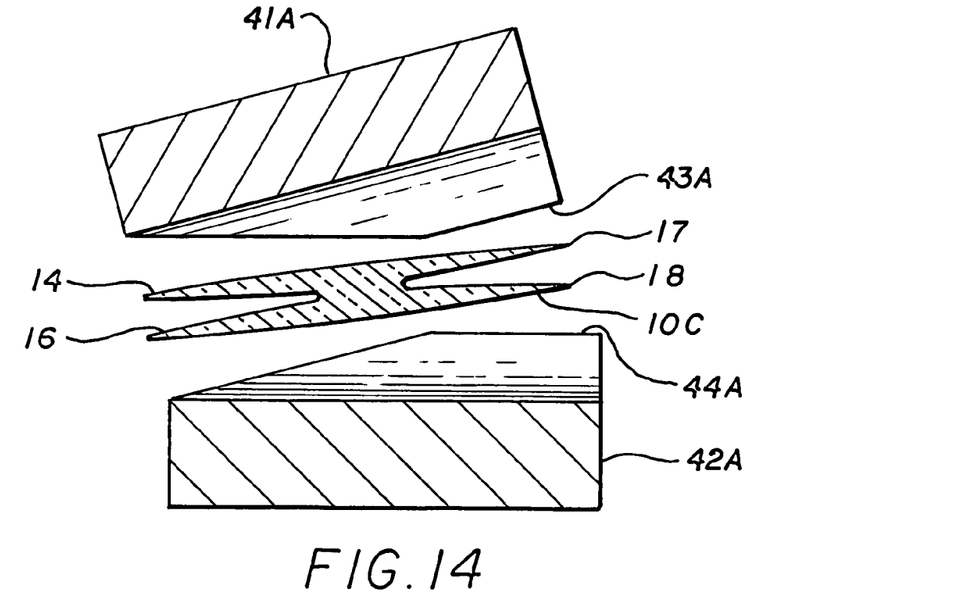

A completed preform 10A is shown in FIG. 3, having a curved length 26, with a radius 28. To accomplish this, the upstanding legs 12 and 14 are pushed over onto the one of the bottom portions 16 or 17 as shown in FIG. 14. The folded preform is then placed in the die 30 shown in FIG. 4 which includes a cutter head 31 and receiver pad 32. The cutter head 31 incorporates staggered blades 33 having a width 34 as shown in FIG. 4 slightly greater than the width of the warp threads 20, allowing for some mismatch in warp thread location. This allows the warp threads 20 to be cut (darted) periodically into segments such that the cuts in each tread are spaced from the cuts in the adjacent treads as shown in FIG. 6. The spacing 35 of the cuts should be as large a distance as possible, but still allowing the curved length 26 to be formed. Thus some experimentation may be required to obtain the optimum spacing.

Figure 8:
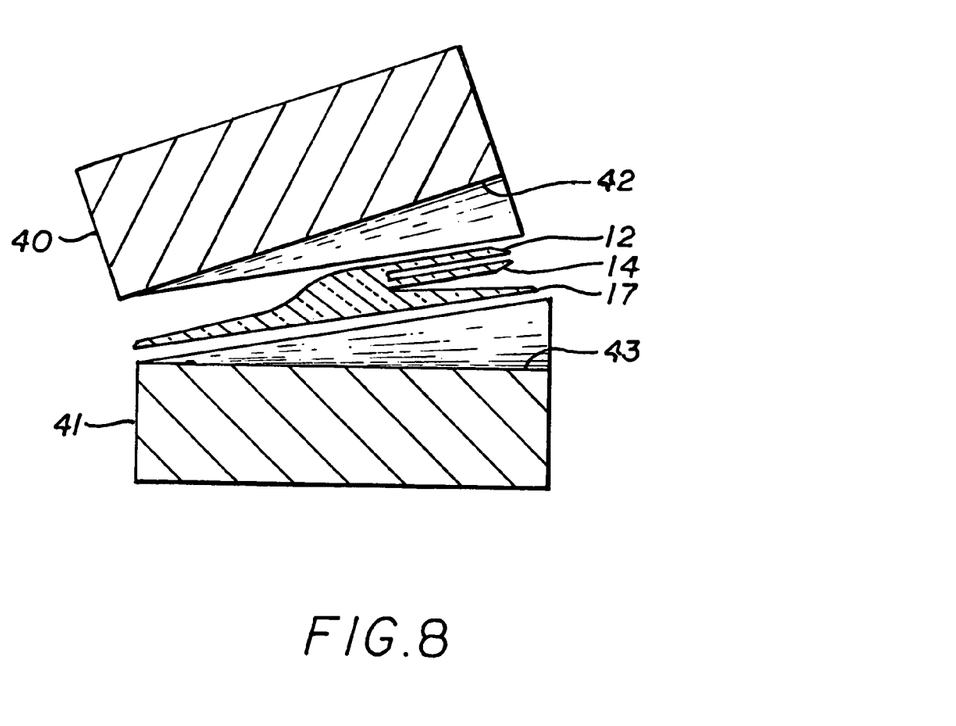
FIG. 8 is a cross-sectional view of the die assembly shown in FIG. 7 illustrating a first method of stretching in order to form the preform shown in FIG. 3.

If the part is to be simply curved shape as shown in FIG. 3, the darted preform 10 is folded as shown in FIG. 8 with the legs 12 and 14 bent over on to leg 16. The preform 10 is placed in a sine-wave shaped die assembly 40 having matched die halves 41 and 42 with mating sign-wave shaped forming surfaces 43 and 44 respectively. The sign-wave pattern is on forming surface 43 is tapered from ends 45 and 46 on die half 41 and the forming surface 44 is tapered from ends 47 and 48 on forming surface 44. What the sine wave forming accomplishes is a stretching that is zero at the end of bottom portion 17 and a maximum at the end of bottom portion 16.

Figure 9:
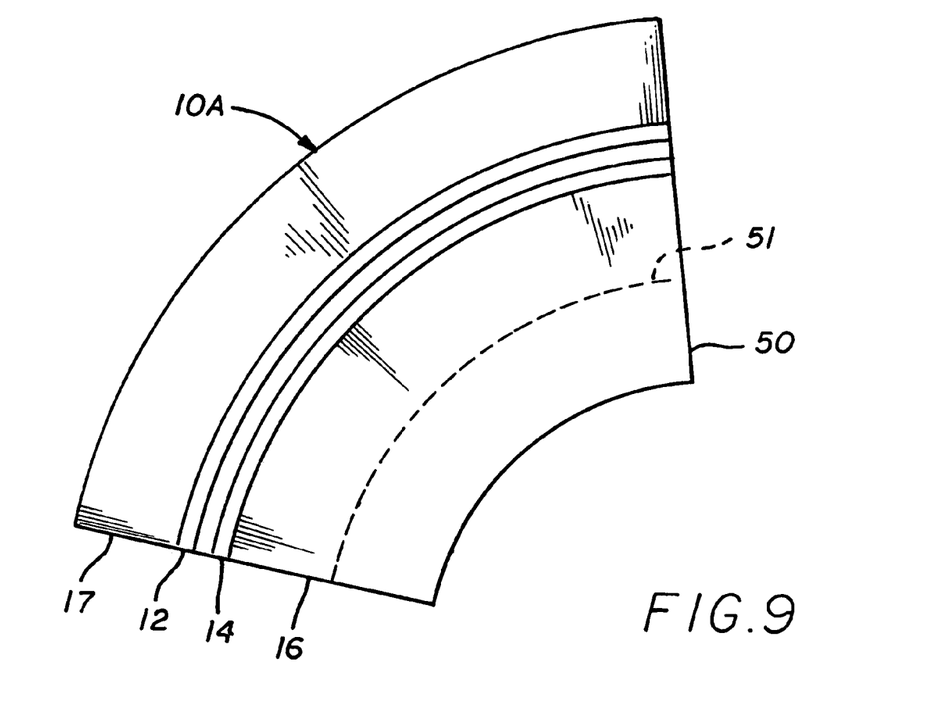
FIG. 9 is a cross-sectional view of a completed structure using the preform shown in FIG. 3.

The now stretched preform 10 can be placed in a die assembly (not shown) and formed into its final shape. Alternately the stretched preform can be shaped by hand. Referring to FIG. 9, it can thereafter be resin infused by any of several existing resin infusion processes and be used to join to structural elements together. For example, structural elements 52A and 52B, by the process set forth in WIPO Publication WO 01/64387 A1 Production, Forming, Bonding Joining And Repair Systems For Composite And Metal Components by N. Graham. Of course, the preform could be resin infused prior to darting and stretching.

Figure 10:
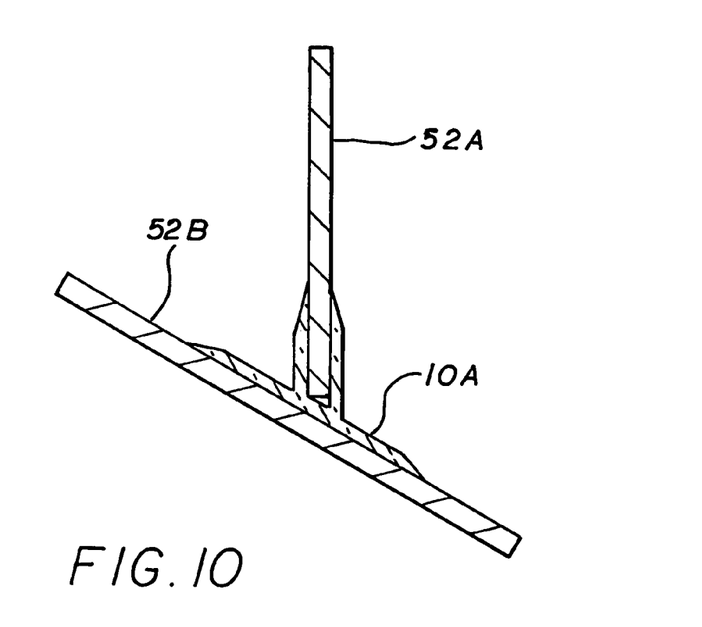
FIG. 10 is a perspective view of the preform having a convex curvature.
Figure 11:
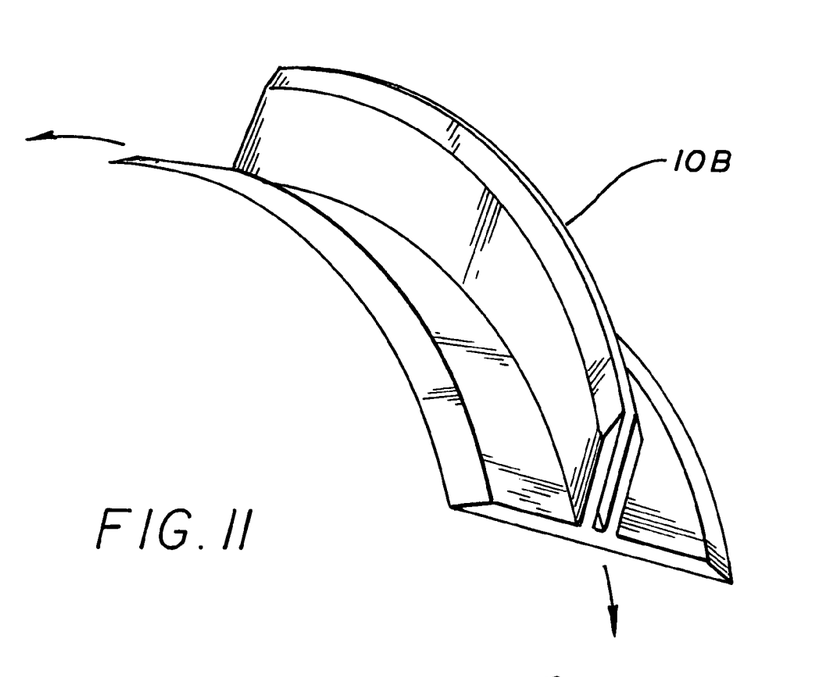
FIG. 11 is a cross-sectional view of the die assembly shown in FIG. 7 illustrating a second method of stretching the preform to obtain the curvature shown in FIG. 10.

If the completed preform requires curvature in a convex shape as illustrated in FIG. 10 and designated by numeral 10B, the preform 10 is folded the shape as illustrated in FIG. 11 with the legs 12 and 14 folded together and portions 16 and 17 folded together. As illustrated the die halves 41A and 42A have forming 43A and 44A. Stretching would only from the center outward toward the end of the legs 12 and 14 where stretching would be at a maximum.

Figure 12:
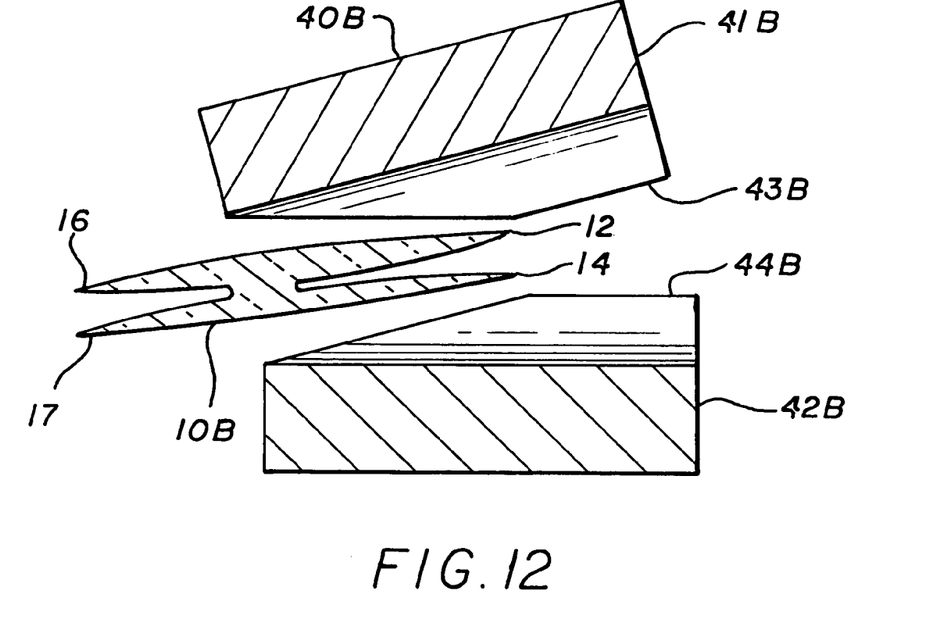
FIG. 12 is a perspective view of the preform having a concave curvature.
Figure 13:
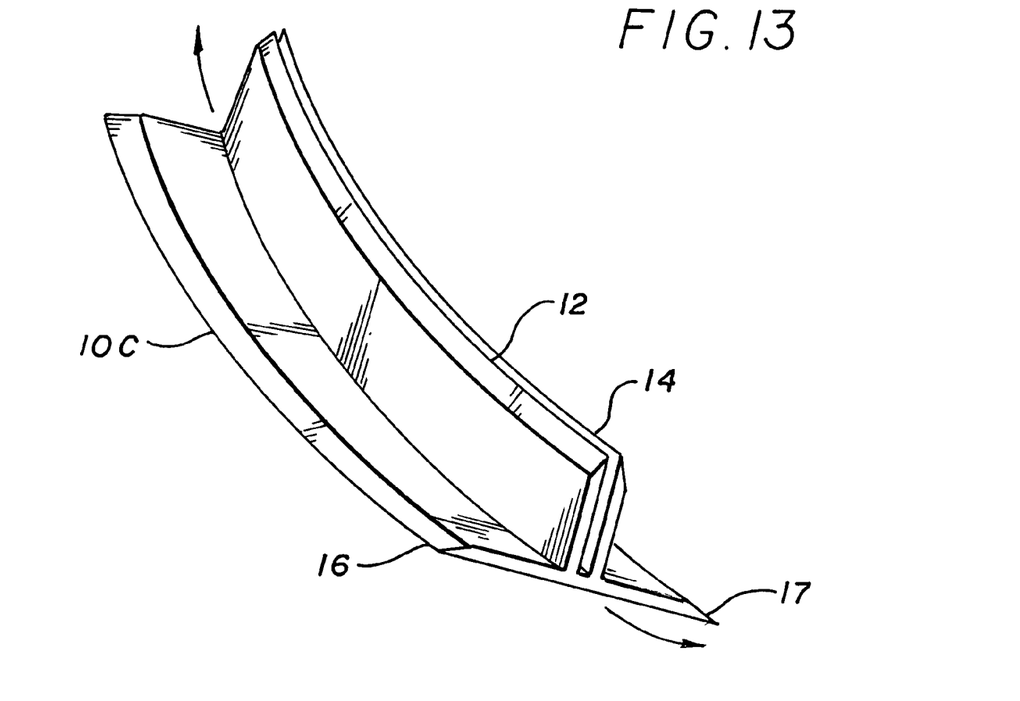
FIG. 13 is a cross-sectional view of the die assembly shown in FIG. 7 illustrating a third method of stretching the preform to obtain the curvature shown in FIG. 12.

If on the other hand, the preform final shape shown in FIG. 12, and designated by numeral 10C, is desired, then, as illustrated in FIG. 13, the legs 12 and 14, and portions 16 and 17 are brought together as in the previous example, and placed in the die assembly 40B having die halves 41B and 42B with forming surfaces 43B and 44B. However, stretching is accomplished by placing the folded preform 10 in the sine-wave dies such that stretching of the legs 12 and 14 is a minimum at there ends and becomes a maximum at the center. Thereafter, stretching of the bottom portions 16 and 17 is held constant.

Thus it can be seen that the process will allow the PI shaped preform to molded into numerous curved shapes, many more than have been described herein. While there is a weakening of the preform due to the cutting of the warp fiber, the loss of strength has proven acceptable in most applications, particularly where the primary loads and distributed along the fill fiber.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to industries manufacturing composite structures, particularly, the aircraft industry.

NOMANCLAURE LIST

10 WOVEN PI PREFORM
12&14 UPSTANDING LEGS
16&17 BOTTOM FOOT PORITONS
18 ROOT PORTION
20 WARP FIBERS
21 FIBERS PERPENDICULAR TO THE STANDING LEGS
22A&22B ARROWS POINT TO CURVATURE
24 ARROW INDICATING BEND DIRECTION
26 CRUVED LENGTH OF PREFORM 10A
28 RADIUS OF CURVE
30 DIE
31 CUTTER HEAD
32 BLADES
33 WIDTH OF BLADES
35 SPACING OF CUTS
40 DIE ASSEMBLY
41 DIE HALF
42 DIE HALF
43 FORMING SURFACE
44 FORMING SURFACE
47 TAPERED END FORMING SURFACE 43
48 TAPERED END FORMING SURFACE 44
52A&52B STRUCTURAL ELEMENTS
10B PREFORM
41A DIE HALF
42B DIE HALF
43A FORMING SURFACE OF DIE HALF 41A
44B FORMING SURFACE OF DIE HALF 42A
10C PREFORM
41B DIE HALF
42B DIE HALF
43B FORMING SURFACE OF DIE HALF 41B
44B FORMING SURFACE OF DIE HALF 42B

The invention claimed is:

1. A process for forming preform having a first portion and a second portion at an angle to the first portion, the first portion being curved, the process comprising the steps of:
   folding the first portion onto the second portion;
   cutting threads of the first portion for permitting the first portion to be curved without crumples;

stretching the first portion;

unfolding the first portion off of the second portion; and forming the first portion into a curve without crumples.

2. The process as set forth in claim 1 including the step of impregnating the preform prior to the step of cutting the threads.

3. The process as set forth in claim 2 wherein the step of stretching further comprises the steps of:

providing a first die and a mating second die, the first die and the mating die defining molding surfaces having a tapered sine wave configuration;

disposing the folded and cut first and second portions between the first die and the second die; and closing the first die and the second die onto first and second portions.

4. The process of claim 3 wherein the stretching step comprises the step of closing the first die onto the second die.

5. The process of claim 1 wherein the threads are cut into the curved portion parallel to the direction of curvature over a length equal to the length of the curve, such that the cuts in each thread are spaced from the cuts in the adjacent threads.

6. A process for forming a preform having a curved portion, the curved portion having a progressively increasing radius from a first edge to a second edge, the process comprising the steps of:

providing a stretchable preform;

stretching the preform with mating dies for progressively expanding the preform from the first edge to the second edge; and after the stretching step, shaping the preform into a substantially flat curved configuration to form the curved portion.

7. The process of claim 6 wherein the curved portion is a foot portion of the preform.

8. The process of claim 6 wherein the curved portion is a leg portion of the preform.

9. The process of claim 6 wherein the preform is darted.

10. The process of claim 6 wherein the shaping step comprises the step of forming the stretched preform about a die surface of a second die having a final desired shape of the preform.

11. The process of claim 6 wherein the mating dies define molding surfaces having a tapered sine wave configuration.

12. The process of claim 11 wherein the stretching step comprises the steps of:

disposing the preform between the mating tapered sine wave dies;

aligning the inner radius to a small amplitude end of the mating tapered sine wave dies;

aligning the outer radius to a large amplitude end of the mating tapered sine wave dies; and closing the mating tapered sine wave dies onto the preform.

13. The process of claim 6 wherein the curved portion is in a plane, the stretching step is accomplished by stretching the preform out of the plane, and the shaping step is accomplished by shaping the curved portion into the plane.

* * * * *